July 3, 1956  J. M. HEERES  2,752,822
MIRROR FOR LADIES HOSE
Filed Jan. 21, 1953
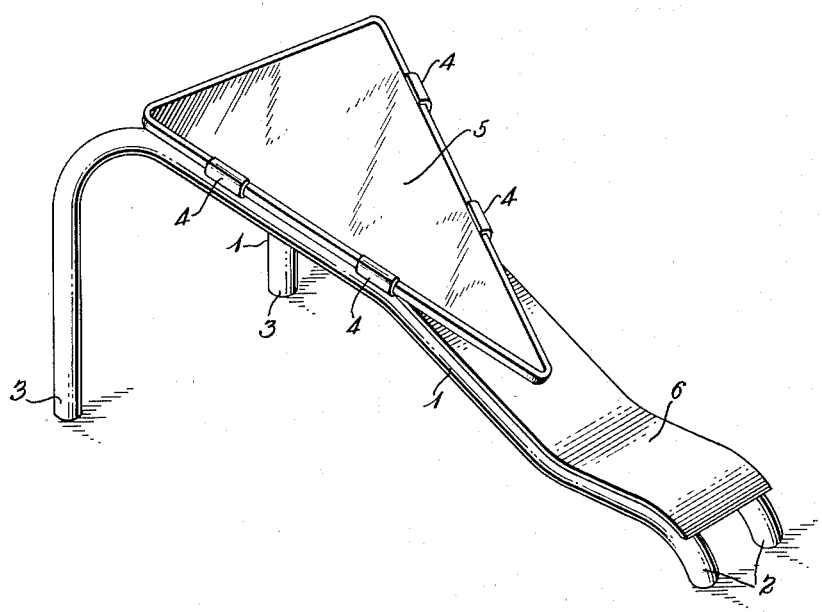
INVENTOR.
Jan Martinus Heeres
BY
Met R. Poston
ATTORNEY United States Patent Office 2,752,822
Patented July 3, 1956

2,752,822

MIRROR FOR LADIES HOSE

Jan Martinus Heeres, Arnhem, Netherlands

Application January 21, 1953, Serial No. 332,444

Claims priority, application Netherlands January 24, 1952

1 Claim. (Cl. 88—97)

This invention relates to a device particularly useful for observing whether the seam of a ladies hose runs straight and in the most desirable way along the back of the leg.

It is a generally recognized fact that much of the beauty and pleasing effect resulting from the wearing of rayon, nylon, or silk hose by a well-dressed lady may be destroyed if the hose are put on in a careless manner. A frequently observed fault is that the seam of the hose is not quite straight or is not placed precisely along the middle of the back of the wearer's leg. In other words, the hose is more or less awry, and this is particularly noticeable by glancing at the same of the hose. For the purpose of carefully examining the seam of her hose, a smartly dressed woman has heretofore required a large mirror reaching all the way to the floor. Even with the use of such a mirror, a somewhat awkward posture is required and adjustment of the hose to make the seam straight is not easy.

It is an object of the present invention to provide a device used in putting on hose which makes it possible to easily adjust the seam straight up and down and to readily observe the manner in which the seam lies along the wearer's leg.

Briefly, the present invention comprises a support or stand on which a mirror has been mounted in such a way that the mirror makes an angle between 20° and 40° with respect to the horizon. Preferably, the mirror is in the shape of a triangle, and the support or stand is so constructed that the part closest to the bottom part of the mirror may be used as a support for the heel of a person's foot. Although the shape of the mirror is not critical and observation is possible with a mirror of most any shape it has been found that the most favorable results are obtained by the use of a triangular mirror fixed on the stand in such a way that an angular point forms the lowest part of the mirror. The optimum arrangement providing the easiest observation utilizes a mirror in the form of an isosceles triangle with the equal legs longer than the third side which forms the top of the mirror.

It has been found that such a mirror, mounted at the specified angle and placed in such a way that the lowest point of the mirror is directly behind the heel, makes it possible for a lady to observe the back side of her leg by merely looking downward. When the mirror is not mounted in the manner specified above, it has been found that comfortable observation of the back side of a hose wearer's leg is not possible. The observation has been found to be particularly easy when the mirror is mounted at an angle of about 30°.

It is possible to mount the mirror in accordance with the present invention in such a way that the lowest part of the mirror is next to the floor. In this case, of course, it is necessary for the observer to place her heel on the floor next to the mirror. However, it is preferred to mount the mirror in such a way that the lowest part of the stand on which the mirror is mounted provides a support for the heel. When the heel is placed on this support, then, the lowest part of the mirror is automatically positioned next to the heel and observation of the hose seam is easily made. It has been found that observation of the seam can sometimes be facilitated when it is possible for the observer to change the angle of the mirror a small amount by means of a slight pressure on the heel. If desired, this may be achieved by making the stand between the heel support and the mirror of a material having resilient properties. In such a construction, the mirror automatically assumes its normal position when the pressure of the heel is released. In an alternative construction, the stand supporting the mirror might be provided with a spring biased hinge, with the spring guaranteeing that the stand will return to its normal position when pressure of the heel is released. Either of the foregoing modifications have been found to be particularly useful by ladies with a somewhat deviated figure, e. g., very corpulent ladies.

The stand supporting the mirror may be constructed in any suitable way. In its simplest form, it may consist merely of a block of wood. A particularly ornamental accessory for use in ladies dressing rooms, restaurants, stores, hotel rooms, etc., is obtained by constructing the stand of a rust-proof metal, such as stainless steel or a chromium plated metal.

The drawing shows a perspective view of one form of the invention. In the drawing, the stand for the mirror is formed by two chromium plated metal pipes 1. Pipes 1 are suitably bent to form two lower legs 2 and two upper legs 3. The portion of pipe 1 connecting the lower legs 2 and upper legs 3 is inclined at an angle of about 30° with respect to the horizontal plane. Mounted on the sloping part of the stand formed by pipes 1 by means of chromium plated clips 4 attached to pipe 1 is a mirror 5 in the form of an isosceles triangle. Mounted on the lower part of the slope of the stand and extending up underneath the lower part of the triangular mirror 5, is a steel plate 6. Plate 6 is connected to each of the pipes 1 by any suitable means. This steel plate 6 forms a support for the heel of the observer's foot. The size of the stand used in the present invention is not critical. For a model such as that shown in the drawing, very satisfactory results are obtained when the total height is about 18–20 centimeters and the length from the upper legs 3 to the lower legs 2 is about 25–30 centimeters.

Other embodiments of the invention will be obvious from the foregoing description, and it is to be understood that the invention is limited only by the appended claim.

What is claimed is:

A device for observing the hose seam on the observer's leg comprising a supporting framework, a triangular shaped mirror mounted on said framework, and a heel supporting member attached to said framework, the surface of said mirror being disposed at an angle between about 20 degrees and about 40 degrees with respect to the horizon with one point of said triangle forming the lowest part of said mirror on said framework, the heel supporting surface of said heel supporting member being disposed adjacent said point of said triangle, said supporting framework being sufficiently resilient to enable the observer to change the angle of the mirror a small amount by means of a slight pressure on the heel supporting surface.

References Cited in the file of this patent

UNITED STATES PATENTS

| 735,204 | Buckenberger | Aug. 4, 1903 |
| 1,005,731 | Miles | Oct. 10, 1911 |
| 1,262,712 | Stone | Apr. 16, 1918 |
| 1,570,408 | Stevenson | Jan. 19, 1926 |
| 1,584,105 | Lenz | May 11, 1926 |
| 1,832,248 | Schrader | Nov. 17, 1931 |
| 2,167,795 | Bentz | Aug. 1, 1939 |